(12) United States Patent
Villagran et al.

(10) Patent No.: US 6,228,414 B1
(45) Date of Patent: *May 8, 2001

(54) LOW-FAT SNACKS HAVING IMPROVED EATING QUALITIES AND DOUGH COMPOSITIONS USED TO PREPARE LOW-FAT FABRICATED SNACKS

(75) Inventors: Maria Dolores Martinez-Serna Villagran, West Chester; Stephen Paul Zimmerman, Wyoming; Jada Dawn Reed, Cincinnati; Paul Seiden, Cincinnati; S Michelle Brower, Cincinnati, all of OH (US)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/174,990

(22) Filed: Oct. 19, 1998

Related U.S. Application Data

(60) Provisional application No. 60/062,607, filed on Oct. 20, 1997.

(51) Int. Cl.⁷ .................................................. A21D 10/00
(52) U.S. Cl. ...................... 426/549; 426/438; 426/439; 426/553; 426/808
(58) Field of Search .................................... 426/549, 439, 426/808, 438, 441, 637, 553

(56) References Cited

U.S. PATENT DOCUMENTS

| | | |
|---|---|---|
| 2,634,234 | 4/1953 | Kuhrt . |
| 2,634,278 | 4/1953 | Kuhrt . |
| 2,634,279 | 4/1953 | Kuhrt . |
| 3,615,681 | 10/1971 | Duross et al. ............................ 99/91 |
| 3,914,453 | 10/1975 | Gawrilow ............................. 426/553 |
| 4,335,157 | 6/1982 | Varvil ................................... 426/606 |
| 4,360,534 | 11/1982 | Brabbs et al. ........................ 426/560 |
| 4,678,672 | 7/1987 | Dartley et al. . |
| 4,732,767 | 3/1988 | Seiden et al. ........................... 426/94 |
| 5,045,337 | 9/1991 | Magda et al. ......................... 426/602 |
| 5,085,884 | 2/1992 | Young et al. . |
| 5,171,600 | 12/1992 | Young et al. . |
| 5,464,642 | 11/1995 | Villagran et al. . |
| 5,922,386 | 7/1999 | Reed et al. ........................... 426/549 |
| 5,925,396 | 7/1999 | Reed et al. ........................... 426/549 |
| 5,928,700 | 7/1999 | Zimmerman et al. ................ 426/549 |

FOREIGN PATENT DOCUMENTS

| | | |
|---|---|---|
| 236288 | 9/1986 | (EP) . |
| 233856 | 8/1987 | (EP) . |
| 287158 | 10/1988 | (EP) . |
| 0059507 | 9/1992 | (EP) . |
| WO9217077 | 10/1992 | (WO) . |
| WO 97 25880 | 7/1997 | (WO) . |
| WO 98 00036 | 1/1998 | (WO) . |
| WO9800037 | 1/1998 | (WO) . |

OTHER PUBLICATIONS

"Low Calorie Puff Pastry Margarine" Research Disclosure; vol. 343; Nov. 1, 1992 p. 823.
"Bailey's Industrial Oil and Fat Products" vol. 1; Fourth Edition. Authors: Marvin W. Formo, et al. p. 3, 1979.
"Bailey's Industrial Oil and Fat Products"; vol. 2; Fourth Edition. Authors: Robert R. Allen, et al. pp. 134–143, 1982.
Patent Abstracts of Japan vol. 017, No. 468 (C–1102), Aug. 26, 1993–&JP 05 115242 A (Asahi Denka Kogyo KK), May 14, 1993 –see abstract.

*Primary Examiner*—Lien Tran
(74) *Attorney, Agent, or Firm*—Karen F. Clark; Melody A. Jones

(57) ABSTRACT

Low-fat fried snacks which have reduced waxiness, improved crispness, and improved mouthmelt are disclosed. The low-fat snacks are made from dough compositions comprising starch-based materials, water, and a unique emulsifier-lipid composition. The emulsifier-lipid composition comprises a specific blend of (1) a monoglyceride or mono-diglyceride component, (2) a polyglycerol ester component, and (3) a fat component. Use of the emulsifier-lipid composition in the dough provides textural and flavor advantages in the finished snack.

19 Claims, 4 Drawing Sheets

LOW-FAT SNACKS HAVING IMPROVED EATING QUALITIES AND DOUGH COMPOSITIONS USED TO PREPARE LOW-FAT FABRICATED SNACKS

This Application claims priority to Provisional Application Ser. No. 60/062,607 filed on Oct. 20, 1997

BACKGROUND

The problems of waxiness, slower mouthmelt and reduced crispness that are characteristic of snacks fried in non-digestible fats are well known. These problems are believed to be caused by solids crystallizing in the non-digestible fat that are absorbed by the snack during frying. The non-digestible fat is absorbed by the snack during frying in a liquefied state. As the snack cools, crystallization of the intermediate-melting and low-melting fats occur, and the solids formed as a result of crystallization alter the organoleptical properties of the snack, for example, crispness, waxiness impression and mouthmelt.

Several methods of reducing the waxiness problem associated with snacks fried in non-digestible fats have been recognized and disclosed in the art (see European Patent Application 236,288 to Bernhardt, published Sep. 9, 1986). Representative of these methods include modifying the non-digestible fat composition (see U.S. Pat. No. 5,085,884 to Young, issued Feb. 4, 1992), combining the non-digestible fat with increasing levels of triglyceride fat (see European Patent Application 233,856 to Bernhardt, published Aug. 26, 1987), altering the composition of the dough (see U.S. Pat. No. 5,464,642 to Villagran et al, issued Nov. 7, 1995), and removing excess fat from the snack by stripping with supercritical steam (see U.S. Pat. No. 5,171,600 to Young et al. issued Dec. 15, 1992).

Prior attempts by food formulators to produce low-fat snacks having a crisp texture and reduced waxiness have generally not been successful, insofar as avoiding undesirable textural changes that occur during frying. Additionally, food formulators have had limited success with reducing the waxiness impression of the snack without the use of stripping techniques. Because the non-digestible fat compositions generally have a viscosity higher than that of triglycerides and comprise intermediate-melting and low-melting fats, the products depending on the dough composition tend to expand and collapse uncontrollably during frying. Further, the viscous fat tends to remain on the surface of the snack and tends to be poorly distributed within the internal structure of the snack. Another problem discovered is that the internal structure of snacks made from many dough compositions tend to form either large internal voids which result in snacks having a dense, hard and glassy texture or small voids which results in snacks having foamy (Styrofoam-like) texture.

Products with large voids correspondingly have larger, uninterrupted regions of solid matter creating a denser, harder mass. A cross section of these products can be visually characterized by tunnel like voids surrounded by thick regions of dense mass where the cross-sectional area of a single void can have a size that is about 2.0% to about 4.0% of the total cross sectional area of the product.

Snack products with an internal structure consisting primarily of small voids where the cross-sectional area of single void has a size less than 0.1% of the total cross-sectional area of the product will display a foamy texture due to the elastic resistance provided by the thinner, less rigid mass arranged in a uniform sequence. The cross-sectional appearance of this product is characterized by numerous small voids surrounded by small regions of mass with thicknesses on the same order of magnitude as the void sizes. The foamy internal structure promotes over-hydration of the starch leading to a gummy texture. It has been found that these structures are particularly prevalent when the doughs used to produce the snacks have the improper viscoelastic properties and when insufficient amylose is bound, insufficient water is distributed/available in the dough during frying, and/or when insufficient fat is distributed in the dough. Ideally, the internal structure of a snack will have a homologous mixture of small to large voids randomly dispersed to provide sufficient strength for crispness, but with lower localized solid mass density.

Accordingly, it is an object of this invention to provide low-calorie fabricated snacks having a unique structure.

Another object of the invention is to provide reduced-calorie and low-calorie farinaceous snacks having improved organoleptical properties (e.g., increased mouthmelt, substantially reduced waxiness impressions and substantially improved crispness).

Still another object of the invention is to provide dough compositions used to prepare low-fat snacks.

These and other objects of the invention will become apparent hereafter.

SUMMARY OF THE INVENTION

The present invention relates to fried low-fat fabricated snacks and dough compositions used to prepare low-fat snacks. The snacks have a novel structure distinct from that of other low-fat fabricated snacks fried in compositions comprising non-digestible fat. The snacks are prepared from farinaceous dough.

The low-fat snack has improved crispness, reduced waxiness and increased mouthmelt. The improved texture (e.g. crispness) and mouthmelt are achieved by controlling the internal structure of the fried snack. The expanded structure serves as a means for distributing fat throughout the internal structure and limits the amount of fat remaining on the surface of the snack.

The snacks of the of the present invention comprise non-digestible fat, less than 40% digestible fat, and less than 9.0% of fat having a viscosity of greater than 103 cp remain on the surface of the fabricated snack.

Snacks of the present invention are low-fat fried snack and comprise a multiplicity of individual internal voids. The low-fat snacks have a thickness of from about 0.02 to about 0.20 in. The low-fat fried snacks comprise:

A) from about 0.5% to about 6% moisture

B) from about 20% to about 38% non-digestible fat;

The most preferred dough compositions for delivering the structural, textural and organoleptical benefits of the present invention comprise:

A) from about 50% to about 70% of a starch-based material comprising,
   i) at least about 0.2% modified starch wherein any dried modified starches present have a water absorption index of from about 0.4 to about 8.0 grams of water per gram of modified starch;
   ii) at least about 3.0% hydrolyzed starches having a D.E. value of from about 5 to about 30;
   iii) up to about 96.8% potato flakes having a water absorption of from about 6.7 to about 9.5 grams of water per gram of starch; provided that if any other starch-containing ingredient is present in the starch-based material other than potato flakes, the other starch-containing ingredient has a water absorption index below that of the potato flakes;

B) from about 30% to about 50% added water; and

C) from about 0.5% to about 8% of an emulsifier-lipid composition comprising:
  i) from about 2.0% to about 40% of monoglycerides component comprising,
    (a) from about 60% to about 98% monoglycerides;
    (b) less than 2% free glycerine;
    (c) the balance being diglycerides with small amounts of triglycerides;
  ii) from about 0.5% to about 40% of a polyglycerol ester component comprising,
    (a) less than 50% free polyol glycerine;
    (b) from about 2 to about 10 glycerol units per polyglycerol moiety wherein less than 40% of their hydroxyl groups are esterified with myristic acid, palmitic acid, stearic acid, or mixtures thereof; and
  iii) from about 60% to about 97.5% fat.

The snack products, if fried in fat consisting essentially of non-digestible fat, have a digestible fat content of less than 0.05 gm/30 gram serving. According to another aspect of the invention, the fabricated snack has fat distributed across at least 25% of the internal structure.

The snacks can be prepared using conventional processing equipment in a continuous process.

DETAILED DESCRIPTION

Figure 1A:
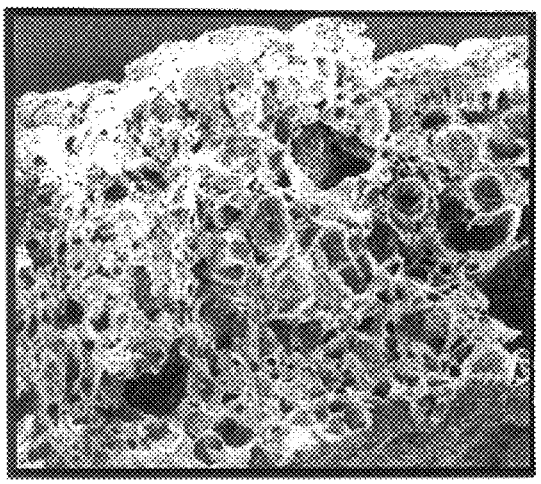
FIG. 1 (a–f). is a cross section elevation view showing the internal structure typical of a starch based snack containing an emulsifier (mono-diglyceride) fried in digestible fat.

As used herein "sheetable dough" is a dough capable of being placed on a smooth surface and rolled to the desired final thickness without tearing or forming holes.

As used herein "starch-based materials" refer to naturally occurring, high polymeric carbohydrates composed of glucopyranose units, in either natural, dehydrated (e.g., flakes, granules, meal) or flour form. The starch-based materials include, but are not limited to, potato flour, potato granules, corn flour, masa corn flour, corn grits, corn meal, rice flour, wheat flour, buckwheat flour, oat flour, bean flour, barley flour, tapioca, as well as modified starches, native starches, and pea starches, starch derived from tubers, legumes and grain, for example cornstarch, wheat starch, rice starch, waxy corn starch, oat starch, cavassa starch, waxy barley, waxy rice starch, glutinous rice starch, sweet rice starch, amioca, potato starch, tapioca starch, and mixtures thereof.

As used herein "kPa" is Kilo Pascals, a viscosity measurement unit.

As used herein "Brabender Unit (BU)" is an arbitrary unit of viscosity measurement roughly corresponding to centipoise.

As used herein, "modified starch" refers to starch that has been physically or chemically altered to improve its functional characteristics. Suitable modified starches include, but are not limited to, pregelatinized starches, low viscosity starches (e.g., dextrins, acid-modified starches, oxidized starches, enzyme modified starches), stabilized starches (e.g., starch esters, starch ethers), cross-linked starches, starch sugars (e.g. glucose syrup, dextrose, isoglucose) and starches that have received a combination of treatments (e.g., cross-linking and gelatinization) and mixtures thereof.

As used herein, the term "added water" refers to water which has been added to the dry dough ingredients. Water which is inherently present in the dry dough ingredients, such as in the case of the sources of flour and starches, is not included in the added water.

All percentages are by weight unless otherwise specified.

The low-fat snacks of the present invention have a novel structure characterized generally by a multiplicity of internal voids having a random distribution of sizes and crisp, low-density solid mass regions. The structure is obtained by adjusting the dough composition so that expansion is controlled when the dough is fried in fat compositions comprising non-digestible fat. The expansion is controlled such that the snack remains crisp and the fat is better distributed across the internal structure of the snack. The expanded structure of the snack also helps reduce the perceived waxiness impression associated with snacks fried in non-digestible fat.

The internal void area is an important aspect of the present invention from the standpoint of increased crispness, reduced waxiness and increased mouth-melt. It is believed that the multi-layers of void spaces in the internal structure of the snack of the present invention create fracture planes during mastication. It is also believed that series of discrete planes offer resistance (i.e. crispness) without hardness. It is further believed that the internal void areas allow rapid breakdown of the snack during mastication without excessive capillary hydration. The reduced waxiness is believed to be the result of fat being more uniformly distributed within the internal structure of the snack in combination with the rapid breakdown of the snack during mastication. This combination provides a thinner film of fat dispersed in the mouth during mastication that can be carried away by small fractured particulate matter in the mouth.

The internal structure comprises a multiplicity of internal voids and spherical nodules. The fat is also distributed across the internal structure of the fried snack. The internal void area and level of solid nodule structure can be determined by microscopic techniques described herein.

The low-fat fabricated snacks of the present invention comprise a total void area of at least 21%, preferably from about 22% to about 40%, more preferably from about 24% to about 36%, and most preferably from about 26% to about 32%.

Less than 12%, preferably from about 4.0% to about 10%, more preferably 6.0% to about 9.0%, and most preferably from about 7.0% to about 8.0% of the voids that are distributed in the void area have a size less than 0.1 units (where a unit represents the % of total product cross sectional area occupied by the void space cross sectional area); less than from about 8.0% to about 70%, preferably from about 10% to about 60%, more preferably from about 20% to about 40%, and most preferably from about 25% to about 35% of the voids that are distributed in the void area have a size from about 0.1 to about 0.3; from about 5.0% to about 30%, preferably from about 10% to about 25%, more preferably from about 13% to about 25% of the voids that are distributed in the void area have a size of from about 0.3 to about 0.8; from about 5.0% to about 50%, preferably from about 9.0% to about 45%; more preferably from about 15% to about 40% of the voids that are distributed in the void area have a size of from about 0.8 to about 1.5; less than about 30%, preferably less than about 20%, more preferably less than about 10%, and most preferably less than about 5.0% of the voids that are distributed in the void area have a size of less than 1.5.

The percentage of solid structure present in the internal structure of the snack having a nodule morphological form comprises from about 0% to about 30%, preferably from about 1.0% to about 25%, and more preferably from about 2.0% to about 20% of the internal structure of the snack.

The novel structural aspects of the snacks of the present invention are characteristic features of the present invention.

The low-fat snacks of the present invention have a unique structure. The volume hydration ratio (described herein) is a measurement relating to the volume of internal voids in the finished product. A higher volume hydration ratio indicates a snack is less dense.

The low-fat snacks of the present invention have a volume hydration ratio of at least about 0.05 gm water/gm chips, preferably at least about 0.15 gm water/gm chips, more preferably at least about 0.19 gm water/gm chips, and most preferably at least about 0.20 gm water/gm chips.

The thin section microscopy technique (described herein) was used in quantification of the fat distribution within the product. The emulsifier lipid composition delivered an increased level of fat dispersion.

The low-fat fabricated snacks of the present invention preferably comprise 15 to 40% fat, more preferably 22 to 38% fat, most preferably 24 to 34% fat wherein at least 25%, preferably at least 30%, more preferably 40% and most preferably 45% is distributed across the internal structure of the snack and less than 9.0%, preferably less than 7.0%, more preferably less than 6.0% and most preferably less than 5.0% by weight of snack of the surface fat have a viscosity of greater than 103 cp at 92° F. (33.3° C.).

The novel structure of the present invention will be understood best by comparing it with the structure of a corresponding snack fried in digestible and typically non-digestible fat and by referring to the accompanying drawings which are described in detail below.

The internal chip structure was characterized directly by cross sectional and thin sectional microscopy techniques. The cross sectional measure was used to define the types of void areas present and their relative distribution. Four classes of structure were identified; solid structure, small voids, large voids, and nodules. Voids were differentiated from solid structures based on the contrast of light reflected from the structure with voids giving a darker shading due to more light absorption.

Figure 1B:
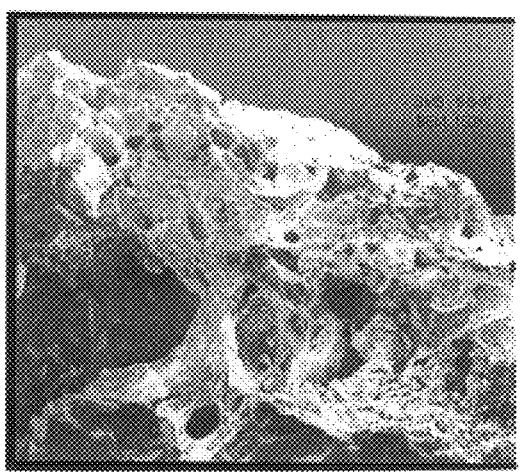
Figure 1C:
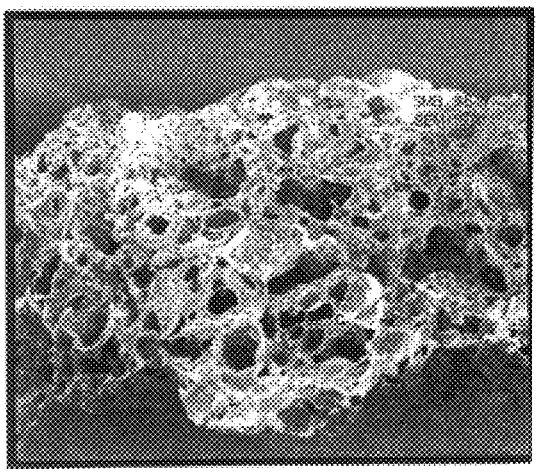
Figure 1D:
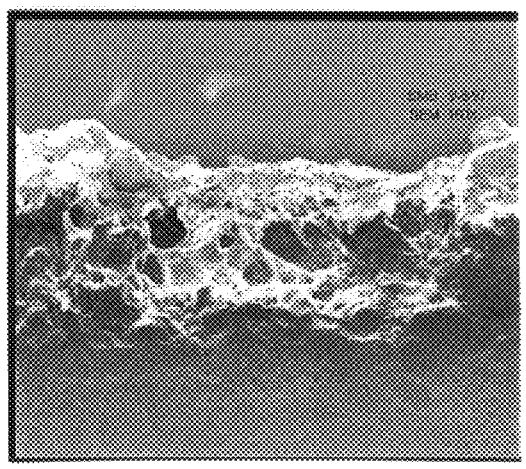
Figure 1E:
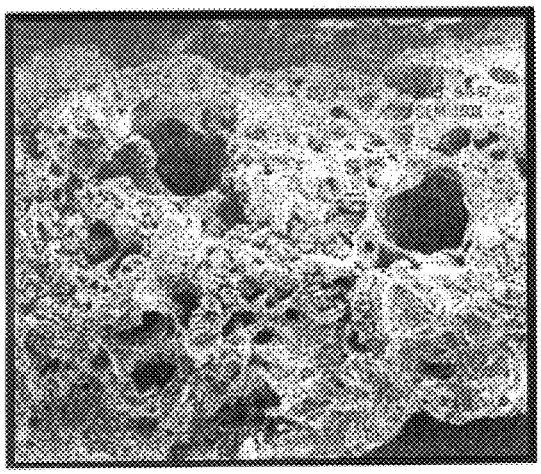
Figure 1F:
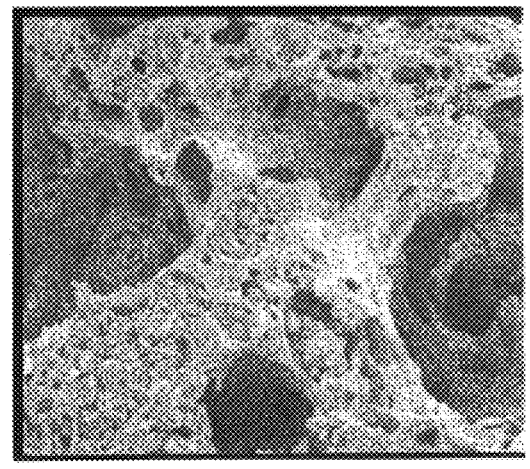

FIG. 1. Is a cross section elevation view showing the internal structure of a starch based snack containing an emulsifier (mono-diglyceride) fried in a digestible fat. The structure is a random dispersion of voids covering a homologous range of sizes. A multitude of voids are in the <0.1 to 0.1 to 0.3 unit size range both grouped in clusters and intermittently around larger voids. The solid mass region is characterized by thin, platelet regions with some having a honeycomb appearance.

Figure 2A:
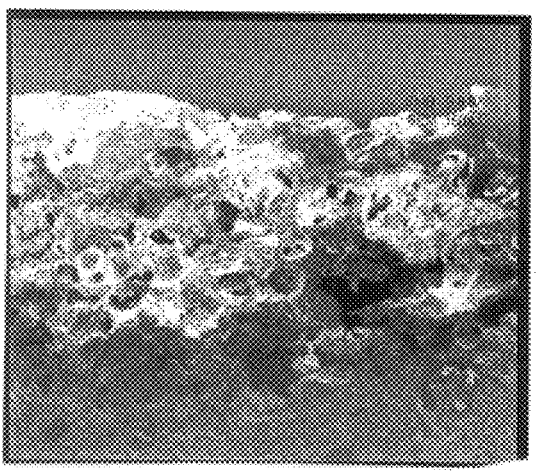
FIG. 2 (a–f). is a cross section elevation view showing the internal structure typical of a starch based snack containing an emulsifier-lipid composition (mono-diglyceride/non-digestible fat). The snack has been fried in non-digestible fat.
Figure 2B:
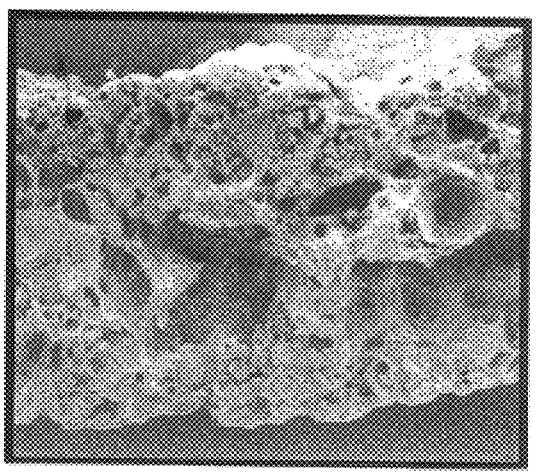
Figure 2C:
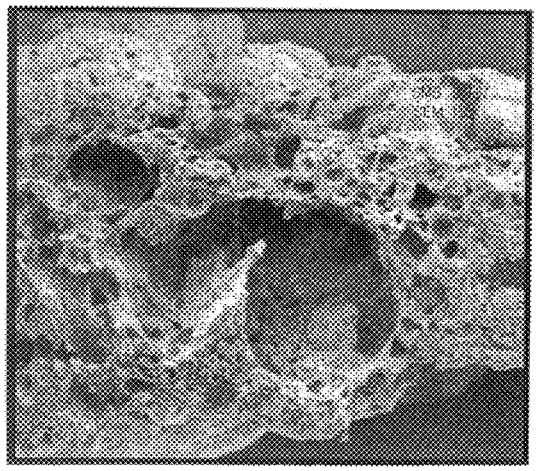
Figure 2D:
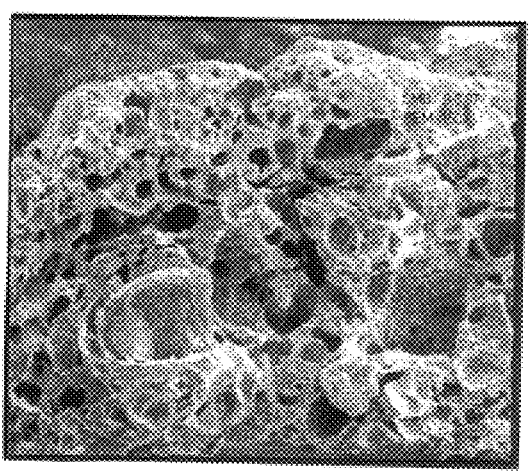
Figure 2E:
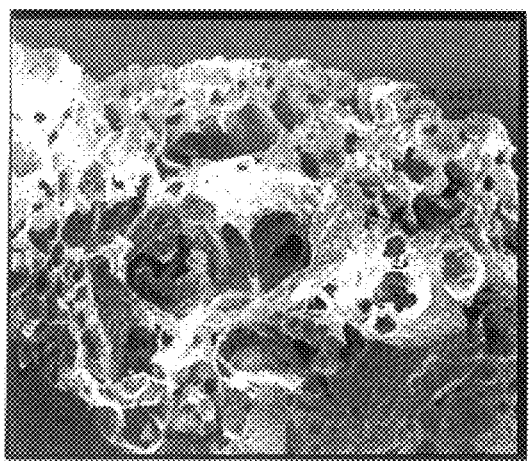
Figure 2F:
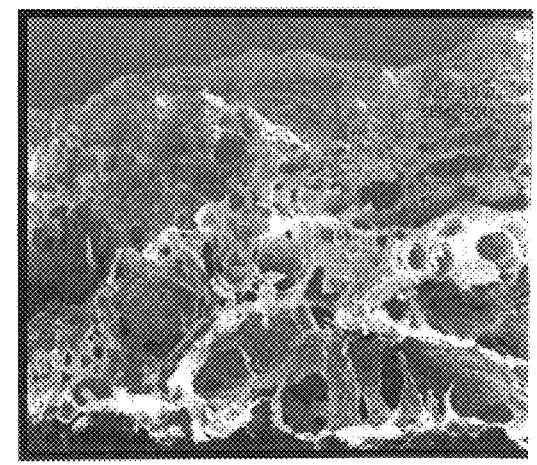

FIG. 2. Is a cross section elevated view showing the internal structure of a starch based snack containing an emulsifier-lipid composition (distilled monoglyceride/non-digestible fat) fried in non-digestible fat. The predominant feature of the internal structure is large cavernous voids with entire void distribution shifted towards larger sizes. The solid mass has thicker denser regions with less void interruption, particularly at the edge of the snack.

Figure 3A:
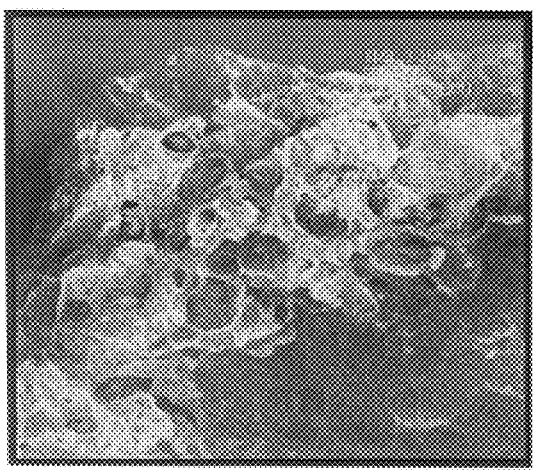
FIG. 3 (a–f). is a cross section elevation view showing the internal structure typical of a starch based snack containing an emulsifier-lipid composition (polyglycerol ester/non-digestible fat). The snack has been fried in non-digestible fat.
Figure 3B:
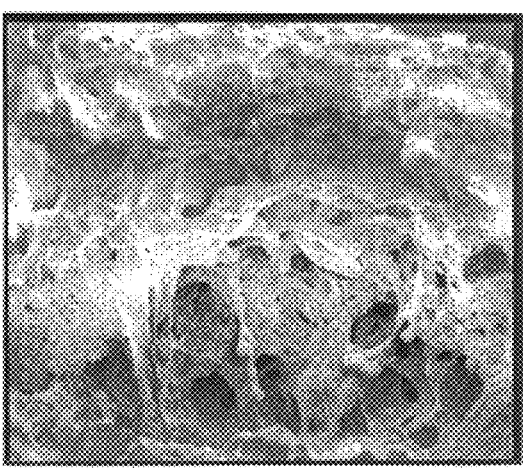
Figure 3C:
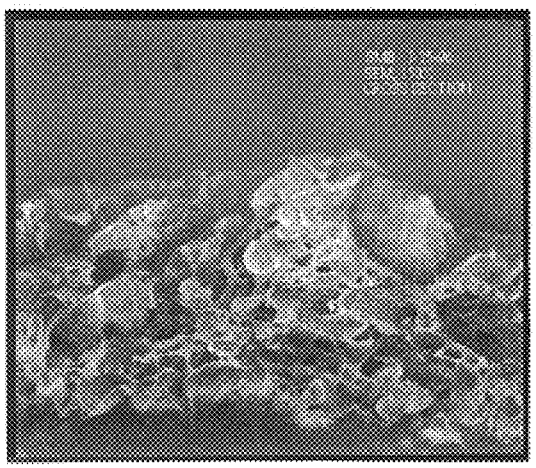
Figure 3D:
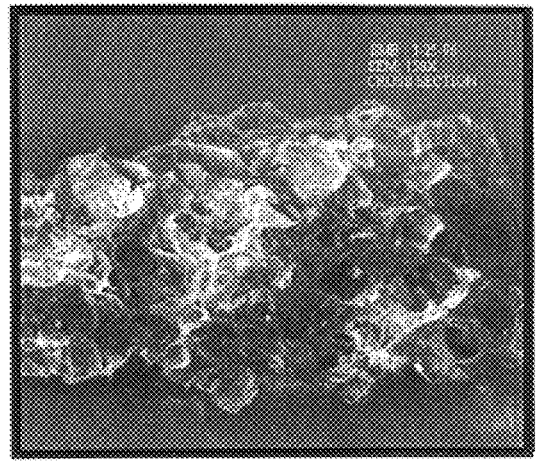
Figure 3E:
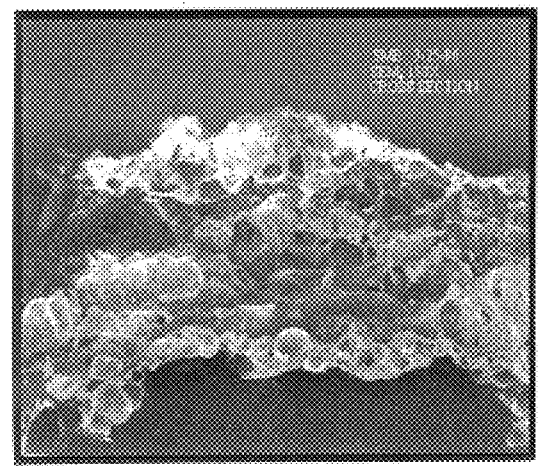
Figure 3F:
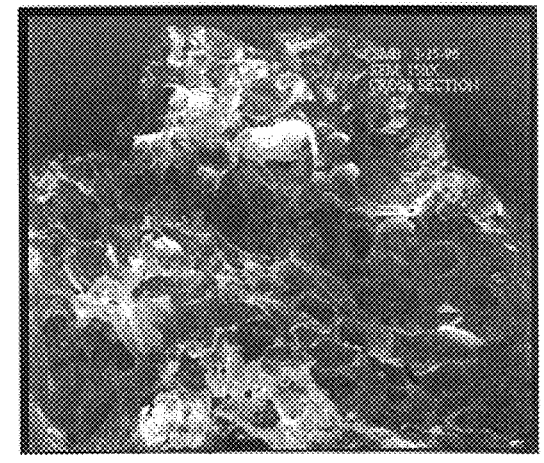

FIG. 3. Is a cross section elevated view showing the internal structure of a starch based snack containing an emulsifier-lipid composition (polyglycerol ester/non-digestible fat) fried in non-digestible fat. The void size distribution of this structure is shifted to smaller sizes with a low percentage of large voids. The solid mass is characterized by dense regions with low void interruption.

Figure 4A:
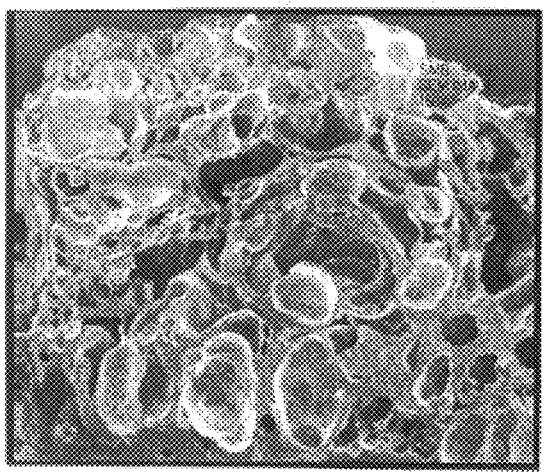
FIG. 4 (a–e). is a cross section elevation view showing the internal structure of the starch based snack of the present invention containing an emulsifier-lipid composition (mono-diglyceride/polyglycerol ester/non-digestible fat). The snack has been fried in non-digestible fat.
Figure 4B:
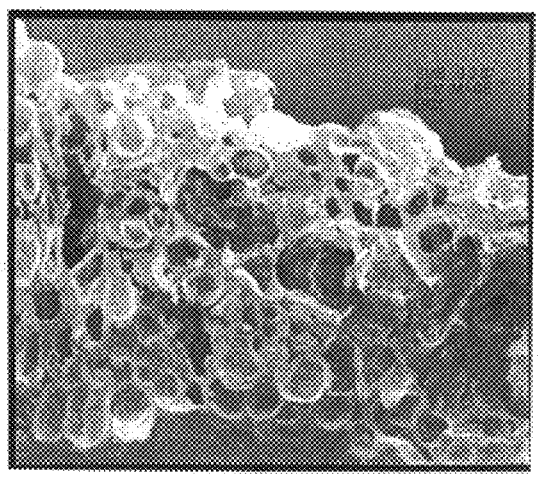
Figure 4C:
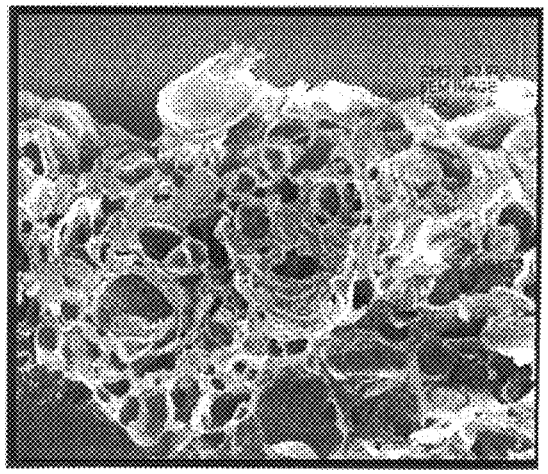
Figure 4D:
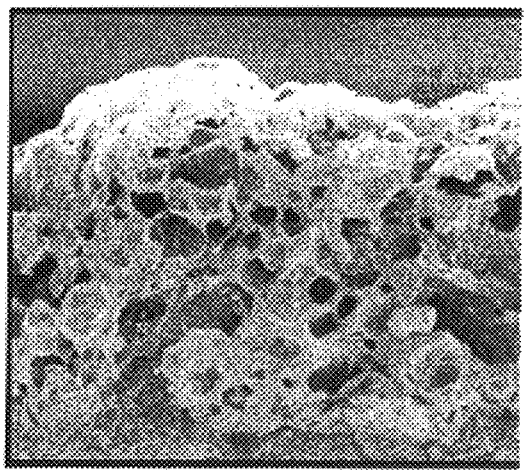
Figure 4E:
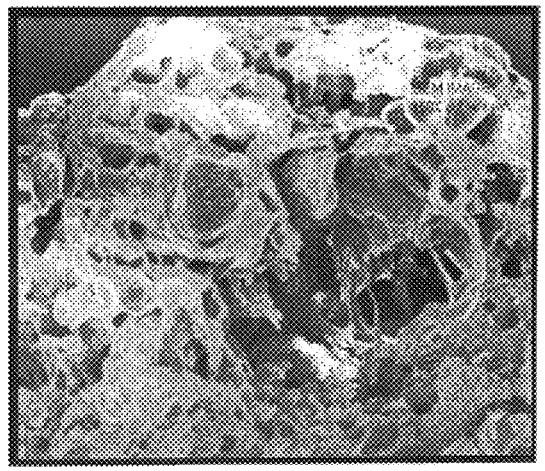

FIG. 4. Is a cross section elevated view showing the internal structure of a starch based snack containing an emulsifier-lipid composition (distilled monoglyceride/polyglycerol ester/non-digestible fat) fried in non-digestible fat. The void size distribution is about uniformly weighted across all size ranges within the <0.1, 0.1–0.3, 0.3–0.8, and 0.8–1.5 unit size ranges with no one size predominating. The width of the solid mass regions is homologously dispersed with thicker regions interrupted by a multitude of small voids. The presence of nodule structures is a predominant feature of the solid mass. Nodules resemble a rounded or elliptical bubble that consists of a void region surrounded intimately by solid mass. The nodules can be observed in single quantities within the center interior structure or in multilayered clusters towards the edge of the structure.

Dough Compositions

The low-fat fabricated products of the present invention are prepared from a dough comprising starch-based materials, an emulsifier-lipid component, and water. The dough is cut into pieces and fried in a fat composition comprising non-digestible fat.

In accordance with the present invention, novel low-fat fried snacks having unique structure are produced from a variety of dough compositions. The novel structures of the low-fat fried snacks of the present invention can be prepared from conventional starch-based materials or ingredients containing starch. Generally, the snacks are prepared by mixing together starch-based materials, an emulsifier-lipid component and water to form a dough. The dough is sheeted and formed into pieces which are then fried in fat. The dough at the time of frying comprises:

a) from about 50% to about 70% of starch-based materials;

b) from about 30% to about 50% added water; and c) from about 0.5% to about 8% of an emulsifier-lipid composition An important component in the dough compositions of the present invention are the starch-based materials. The doughs of the present invention can comprise from about 50% to about 70%, preferably from about 55% to about 65%, and more preferably about 60% of a starch-based material. The starch-based material can comprise from about 25 to 100% potato flakes with the balance (i.e., from 0 to about 75%) being other starch-containing ingredients such as potato flour, potato granules, corn flour, masa corn flour, corn grits, corn meal, rice flour, tapioca, buckwheat flour, oat flour, bean flour, barley flour, wheat flour, as well as modified starches, native starches, and pea starch, starches derived from tubers, legumes and grain, for example cornstarch, wheat starch, rice starch, waxy corn starch, oat starch, cavassa starch, waxy barley, waxy rice starch, glutinous rice starch, sweet rice starch, amioca, potato starch, tapioca starch, and mixtures thereof. The starch-based material preferably comprises from about 40% to about 90%, more preferably from about 50% to about 80%, and even more preferably about 60% to about 70%, potato flakes and from about 10% to about 60%, preferably from about 20% to about 50%, and more preferably from about 30% to about 40%, of these other starch-containing ingredients.

Particularly preferred starch-based materials of the present invention are made from dehydrated potato flakes and potato granules wherein the potato flakes comprise from about 25% to about 95%, preferably from about 35% to about 90%, and more preferably from about 45% to about 80% of the starch-based material, and the potato granules comprise from about 5% to about 75%, preferably from about 10% to about 65%, and more preferably from about 20% to about 55%, of the starch-based material.

Another preferred embodiment can be made using a mixture of potato flakes and potato granules, combined with other starch-containing ingredients that are not potato flakes or granules. Typically, the combined flakes and granules comprise from about 40% to about 90%, preferably from about 50% to about 80%, and more preferably from about 60% to about 70% of the starch-based material, while the other non-potato flake/granule starch-containing ingredients comprise from about 10% to about 70%, preferably from about 20% to about 50%, and more preferably from about 30% to about 40%, of the starch-based materials.

Particularly preferred potato flakes comprise from about 40% to about 60% broken cells, from about 16% to about 27% amylose, from about 5% to about 10% moisture, and at least about 0.1% emulsifier. Additionally, the dehydrated flakes of the present invention have a water absorption index of from about 6.7 to about 9.5 grams of water per gram of flakes, a hot paste viscosity of from about 100 Brabender Units (BU) to about 320 BU and a cold paste viscosity of from about 100 BU to about 200 BU. From about 40% to about 60% of the dehydrated potato flakes remain on a #40 U.S. screen.

Particularly preferred potato granules have a water absorption index of from about 4.0 grams of water per gram of granules to about 7.0 grams of water per gram of granules, preferably from about 4.8 grams of water per gram of granules to about 5.5 grams of water per gram of granules, more preferably from about 5.2 to about 6.0 grams of water per gram of granules and from about 9.0% to about 13% amylose, and preferably from about 10% amylose to about 12% amylose, and more preferably about 11%.

In order to obtain the desired organoleptical properties in the snack product (i.e., crispness, decreased waxiness impression and increased mouthmelt), it is important that the starch-based material comprise at least about 0.2% of a modified starch and at least about 3% hydrolyzed starches having a DE of from about 5 to about 30, and wherein any dried modified starches present have a water absorption index of from about 0.4 to about 8 grams of water per gram of modified starch. It is also important that any potato flakes in the starch-based materials have a water absorption index of from about 6.7 to about 9.5 grams, preferably from about 7.0 to about 9.0, and more preferably from about 7.7 to about 8.3, grams of water per gram of starch and that any other starch-containing ingredients have a water absorption index lower than the potato flakes.

The starch-based materials also preferably comprise a high amylopectin flour or starch (~at least about 40% amylopectin) selected from the group consisting of waxy corn, waxy barley, waxy rice, glutinous rice, sweet rice, and mixtures thereof. When a high amylopectin flour or starch is used it is preferably present at a level of from about 1% to about 15%, preferably from about 2% to about 10%, and more preferably from about 3% to about 6%, by weight of the starch-based materials.

In order to obtain the desired organoleptical properties of the snack and sheetability of the doughs of the present invention, it is important that the high amylopectin flour have a water absorption index lower than the flakes or granules used to make the dough composition. Preferred high amylopectin flours are selected from the group consisting of sweet rice flour, waxy rice flour and waxy corn flour. Particularly preferred high amylopectin starches are available from National Starch and Chemical Corporation, Bridgewater, N.J. and are sold under the trades name of Cereal Crisp™, Amioca™ and Hylon V™ (50% amylose) and Hylon VII™ (70% amylose).

Preferably modified starch is used as an ingredient in the dough compositions of the present invention. (When calculating the level of modified starch according to the present invention, modified starch (e.g., gelatinized starch) that is inherent in potato flakes or granules and flours is not included.)

At least about 0.2% modified starch selected from the group consisting of pregelatinized starches, cross-linked starches, acid modified starches, and mixtures thereof are used in the dough compositions of the present invention. Preferably, a level of from about 0.2% to about 10%, more preferably from about 1% to about 7%, and even more preferably from about 3% to about 5%, modified starch is used. Particularly preferred modified starches are available from National Starch and Chemical Corporation, Bridgewater, N.J. and are sold under the trade names of N-Lite™ (pregelatinized-crosslinked starch), Ultrasperse-A™ (pregelatinized, waxy corn), N-Creamer™ 46 and Corn PCPF400™. This material is a partially pre-cooked corn meal.

Hydrolyzed starch is also preferably included in the dough compositions of the present invention. Hydrolyzed starch is important to the processability of the doughs of the present invention which have relatively low water levels. In the absence of hydrolyzed starches, low moisture levels in the dough can prevent formation of a continuous, smooth extensible dough sheet.

Hydrolyzed starches are typically included in the dough compositions in an amount of at least about 3%, with a usual range of from about 3% to about 15%. Preferably, hydrolyzed starches are included in an amount of from about 5% to about 12%. Suitable hydrolyzed starches for inclusion in the dough include maltodextrins and corn syrup solids. The hydrolyzed starches for inclusion in the dough have Dextrose Equivalent (D.E.) values of from about 5 to about 30, preferably from about 10 to about 20. Maltrin™ M050, M100, M150, M180, M200, and M250 (available from Grain Processing Corporation, Iowa) are preferred maltodextrins. The D.E. value is a measure of the reducing equivalence of the hydrolyzed starch referenced to dextrose and is expressed as a percentage (on a dry basis). The higher the D.E. value, the higher the dextrose equivalence of the starch.

The level of emulsifier added to the dough depends on the amount of work input that the dough will receive in subsequent processing (e.g., extrusion, sheeting) steps. As used herein, the term "added emulsifier" refers to an emulsifier which has been added to the dry dough ingredients. Emulsifiers which are inherently present in the dry dough ingredients, such as in the case of the potato flakes, are not included in the term added emulsifier.

A particularly preferred emulsifier composition for obtaining the snack of the present invention comprises three functional components: a monoglyceride component, a polyglycerol ester component, and a fat component.

The monoglyceride component of the emulsifier system is comprised of mono-diglycerides, distilled monoglycerides, or mixtures thereof. The mono-diglyceride can be made in accordance to well known procedures. One conventional procedure is direct esterification of one or more fatty acids with glycerol followed preferably by distillation to obtain a high purity product containing one or more mono esters. Other procedures for preparation of distilled monoglyceride products are disclosed in U.S. Pat. No. 2,634,234; U.S. Pat No. 2,634,278; and U.S. Pat. No. 2,634,279, all to Kuhrt.

The monoglyceride component is comprised of mono-diglycerides, distilled monoglycerides, or mixtures thereof and may be a mixture of saturated and unsaturated glycerol esters of fatty acids typically derived from hydrogenated to non-hydrogenated vegetable oils such as soybean oil, corn oil, olive oil, sunflower oil, cottonseed oil, palm oil and like vegetable oils, and animal fats such as tallow and lard. The monoglyceride component comprises at least 30% monoglycerides. Preferably, more concentrated mono-diglycerides or distilled monoglycerides are used. The more concentrated mono-diglycerides or distilled monoglycerides comprises at least about 60%, preferably from at least about 70% to at least about 98%, more preferably from at least about 80% to at least about 95%, and most preferably about 90% monoglyceride, with the balance being diglycerides with small amounts of triglyceride and free glycerine. Preferably the amount of free glycerine present in the monoglyceride component is less than about 2.0%. The amount of monoglyceride present in the mono-diglyceride or distilled monoglyceride can be determined using AOCS Cd 11-b-91 (95).

The monoglyceride component useful in the present invention has an iodine value in the range of from about 2 to about 120, preferably from about 20 to about 100, more preferably from about 40 to about 80, and most preferably from about 50 to about 75. The iodine value can be determined using AOCS method Cd 1-25 (93).

Preferably the mono-diglycerides or distilled monoglyceride have a linolenic fatty acid level of less than 3.5%.

Specific mono-diglycerides or distilled monoglycerides within the scope of the present invention are commercially available. Monoglycerides suitable for use in the present invention are sold under the trade names of Dimodan® available from Danisco, New Century, Kans. and DMG 70, available from Archer Daniels Midland Company, Decatur, Ill.

The monoglyceride component comprises from about 2.0% to about 50%, preferably from about 5.0% to about 40%, more preferably from about 10% to about 30%, and most preferably from about 12% to about 25% of the total emulsifier-lipid composition.

The second component of the emulsifier-lipid composition is a polyglycerol ester. Examples of polyglycerol ester include decaglycerol decaoleate, triglycerol monostearate, octaglycerol monostearate, and octaglycerol monopalmitate. These materials are normally not obtained in pure form, but are generally the reaction products of an esterification between a preselected cut of polyglycerols and desired saturated fatty acids. The result is a distribution of polyglycerol mono-ester and higher-esters determined by reactants ratios and reaction conditions.

The polyglycerol esters of the present invention are specifically tailored by controlling the hydrophilic-lipophilic balance (HLB) of the polyglycerol esters. This is done by controlling the balance of esterified to unesterified hydroxyl groups during the process of esterfication. With an increasing number of hydroxyl groups esterified, the polyglycerol ester becomes progressively more lipophilic. This hydrophilic-lipophilic balance of the polyglycerol ester is important in preparing polyglycerol ester for use in sheeted doughs.

Unesterified polyglycerols, long chain polyglycerol monoesters, and diesters and tri-esters of diglycerols and triglycerols should be limited in the polyglycerol ester component of the present invention. Unreacted polyglycerol (i.e. unesterfied) retained in the finished esters have little or no emulsifier functionality, but because of their more polar nature are less soluble in non-digestible lipids leading to phase separation and a non-homogenous emulsifier-lipid composition.

The short chain monoesters are very functional components of the polyglycerol esters in the polyglycerol ester component of the emulsifier-lipid composition and thus their concentration should be relatively high compared to other ester moieties. The di- and triesters of di- and triglycerols are too lipophilic and may also have a deleterious effect on the finished snack product. Saturated diglycerides (e.g. dipalmitin, distearin) and the cyclic diglycerol esters are deleterious emulsifier components and therefore their concentrations should be minimized in the polyglycerol esters. Preferably, the polyglycerol esters of the present invention comprise less than 5% cyclic diglycerol esters and less than 5% diglycerides.

Polyglycerol esters can be purified through fractionation, molecular distillation or solvent crystallization. The fractionated polyglycerol esters are more functional and can be used at lower concentration.

The composition of the polyglycerol ester can be determined by Supercritical Fluid Chromatography described herein.

The polyglycerol esters suitable for use in the present invention comprise less than 50%, preferably from about 2.0% to about 40%, and more preferably from about 5.0% to about 25% free glycerine; from about 5.0% to about 60%, preferably from about 15% to about 50%, more preferably from about 10% to about 45% and most preferably from about 25% to about 40% monoester. The polyglycerol ester of the present invention additionally have from about 2 to about 10 glycerol units per polyglycerol moiety wherein the glycerol units have less than 40%, preferably from about 20% to about 33%, more preferably from about 18% to about 30% of their hydroxyl groups esterified with myristic acid, palmitic acid, stearic acid or mixtures thereof.

The polyglycerol ester component comprises from about 0.5% to about 40%, preferably from about 1.0% to about 35%, more preferably from about 1.5% to about 30% and most preferably 2.0% to about 25% of the total emulsifier-lipid composition.

Polyglycerol esters suitable for use in the present invention are sold under the trade name Lonza Polyaldo®.

The third component of the emulsifier-lipid composition of the present invention is a fat. The terms "fat" and "oil" are used interchangeably herein, unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term. A particularly preferred non-digestible fat suitable for use as the third component of the emulsifer-lipid of the present invention is Olean®, available from The Procter & Gamble Company, Cincinnati, Ohio.

The fat comprises from about 60% to about 97.5% of the total emulsifier lipid composition.

The emulsifier is present in the dough compositions of the present invention in an amount of from about 0.5% to about 8%, preferably from about 2% to about 6%, more preferably from about 3% to about 5% of an emulsifier.

The dough compositions of the present invention comprise from about 20% to about 50% added water, preferably from about 22% to about 40%, and more preferably from about 24% to about 35%, added water. The level of water in flours and starches is usually from about 3% to about 8%. However, if the maltodextrin or corn syrup solids are added as a solution or syrup, the water in this syrup or solution is included as "added water". The amount of added water includes any water used to dissolve or disperse ingredients and includes water present in corn syrups, etc.

Dough Properties

An important factor in obtaining the structure of the fabricated snacks of the present invention is the viscoelastic properties of the dough. Since the doughs are relatively non-flowable an oscillatory test method is used (described herein). The viscoelastic properties can be measured using a Control Stress Rheometer. The viscoelastic property G' (elastic modulus) relates to the elasticity of the dough while G" (viscous modulus) relates to the fluidity of the dough. When a dough sheet has high rigidity or elastic modulus the internal structure of the snack is highly expanded. This expanded structure results in a fried snack that has a foamy (Styrofoam-like) texture and a slow mouth-melt. The G' measurement is an indication of how well the doughs will tolerate stress and also the type of internal structure that will be present in the snack after frying.

When a dough sheet has low rigidity or elastic modulus, the internal structure of the snack is dense. This dense structure results in a fried snack that has a hard, glassy texture. One way of controlling the viscoelastic properties of the dough is by incorporating an emulsifier or blend of emulsifiers in the dough composition. However, it is important that the emulsifier/emulsifier blend not only complexes free amylose, but also coats the starch, and controls fat distribution, while still providing a dough that is extensible, cohesive and sheetable. An emulsifier blend comprising a polyglycerol ester and a non-digestible fat has been found suitable for obtaining the desired structure.

Doughs used to obtain the desired structure comprise a G' of from about 20 kPa to about 70 kPa; preferably from about 30 kPa to about 60 kPa; more preferably from about 35 kPa to about 55 kPa; and most preferably from about 38 kPa to about 50 kPa.

Doughs used to obtain the desired structure comprise a G" of from about 3.0 kPa to about 30 kPa, preferably from about 5.0 kPa to about 25 kPa, more preferably from about 6.0 kPa to about 20 kPa, and most preferably from about 7.0 kPa to about 18 kPa.

The low-fat snacks of the present invention are preferably prepared from doughs that are sheetable and extensible. The sheet strength and extensibility measurement characterize the theological properties of the doughs used to prepare the snacks of the present invention.

The sheet strength is a measurement of the force needed to break a piece of dough. The sheet strength measurement correlates with cohesiveness of the dough and the ability of the dough to resist developing holes and/or tearing during subsequent processing steps. The sheet strength and extensibility can be determined by techniques described herein.

The doughs used to make the snack of the present invention mixed in a conventional low work input mixer, for example, a Hobart® or Cuisinart®, will typically have a sheet strength between about 140 gf to about 375 gf depending on whether the doughs have received low work input or higher work input.

Dough composition receiving relatively low work input typically have a sheet strength measurement of from about 170 gf to about 250 gf, preferably from about 180 gf to about 240 gf, and more preferably from about 190 gf to about 220 gf.

When doughs are produced on a commercial scale where higher work input mixers (for example, a Turboilizer® or extruder) are used, the sheet strength is generally from about 1.5 times to about 2.5 times the sheet strength of the doughs produced from the low work input mixer.

The extensibility is a measurement of the maximum elongation distance achieved prior to structural failure of the dough, after the steady application of a constant force. The doughs used to prepare the snacks of the present invention preferably have an extensibility of from about 5 cm to about 15 cm, preferably from about 7 cm to about 12 cm, and more preferably from about 9 cm to about 11 cm.

When doughs having the preferred dough composition, viscoelastic properties, sheet strength and extensibility are fried in a non-digestible fat, the resulting snack has a slightly expanded structure and crisp texture.

Dough Preparation

The dough of the present invention can be prepared by any suitable method for forming sheetable doughs. The dough compositions of the present invention can be prepared by thoroughly mixing together the flakes, granules, modified starches and added emulsifier. Typically, a water pre-blend of flavoring (optional), modified starches, sucrose and/or salt, and lower water absorption index starch-based materials are mixed separately. The water pre-blend is then added to the potato flour and/or granules mixture and added emulsifier blend and mixed to form a loose, dry dough. Preferred devices for mixing together the dough ingredients are conventional mixers. Hobart® mixers are used for batch operations and Turbolizer® mixers can be used for continuous mixing operations. However, extruders can also be used to mix the dough and to form the sheets or shaped pieces.

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling and gauging equipment can be used. The mill rolls should be heated to about 90° F. (32° C.) to about 135° F. (57° C.). In a preferred embodiment, the mill rolls are kept at two different temperatures, with the front roller being cooler than the back roller.

Dough compositions of the present invention are usually formed into a sheet having a thickness of from about 0.015 to about 0.10 inches (from about 0.038 to about 0.25 cm), and preferably to a thickness of from about 0.02 to about 0.09 inches (from about 0.051 to about 0.229 cm), and most preferably from about 0.025 to about 0.08 inches (0.062 to 0.203 cm). For rippled (wavy shaped) chips, the preferred thickness is about 0.75 inches (1.9 mm). The dough sheet is then formed into snack pieces of a predetermined size and shape. The snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described in published PCT application WO 95/07610, Dawes et al., Jan. 25, 1996, which is incorporated by reference.

Fat Frying

After the snack pieces are formed, they are cooked until crisp. The snack pieces can be cooked by frying, partially frying and then baking or by partially baking then frying. The snack pieces can be fried in a fat composition that consists essentially of non-digestible fat, or a blend of non-digestible fat and triglyceride fat.

Particularly preferred are non-digestible fats such as those described in U.S. Pat. Nos. 3,600,186 to Mattson et al., issued May 12, 1970; 4,005,195 to Jandacek, issued Jan. 25, 1977; 4,005,196 to Jandacek et al., issued Jan. 25, 1977; 4,034,083 to Mattson, issued Jul. 5, 1977; and 4,241,054 to Volpenhein et al., issued Dec. 23, 1980, all of which are incorporated by reference.

The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN®.

By "polyol" is meant a polyhydric alcohol containing at least 4, preferably from 4 to 11 hydroxyl groups. Polyols include sugars (i.e., monosaccharides, disaccharides, and trisaccharides), sugar alcohols, other sugar derivatives (i.e., alkyl glucosides), polyglycerols such as diglycerol and triglycerol, pentaerythritol, sugar ethers such as sorbitan and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose.

By "polyol fatty acid polyester" is meant a polyol having at least 4 fatty acid ester groups. Polyol fatty acid esters that contain 3 or less fatty acid ester groups are generally digested in, and the products of digestion are absorbed from, the intestinal tract much in the manner of ordinary triglyceride fats or oils, whereas those polyol fatty acid esters containing 4 or more fatty acid ester groups are substantially non-digestible and consequently non-absorbable by the human body. It is not necessary that all of the hydroxyl groups of the polyol be esterified, but it is preferable that disaccharide molecules contain no more than 3 unesterified hydroxyl groups for the purpose of being non-digestible. Typically, substantially all, e.g., at least about 85%, of the hydroxyl groups of the polyol are esterified. In the case of sucrose polyesters, typically from about 7 to 8 of the hydroxyl groups of the polyol are esterified.

The polyol fatty acid esters typically contain fatty acid radicals typically having at least 4 carbon atoms and up to 26 carbon atoms. These fatty acid radicals can be derived from naturally occurring or synthetic fatty acids. The fatty acid radicals can be saturated or unsaturated, including positional or geometric isomers, e.g., cis- or trans- isomers, and can be the same for all ester groups, or can be mixtures of different fatty acids.

Liquid non-digestible oils can also be used in the practice of the present invention. Liquid non-digestible oils having a complete melting point below about 37° C. include liquid polyol fatty acid polyesters (see Jandacek; U.S. Pat. No. 4,005,195; issued Jan. 25, 1977); liquid esters of tricarballylic acids (see Hamm; U.S. Pat. No. 4,508,746; issued Apr. 2, 1985); liquid diesters of dicarboxylic acids such as derivatives of malonic and succinic acid (see Fulcher; U.S. Pat. No. 4,582,927; issued Apr. 15, 1986); liquid triglycerides of alpha-branched chain carboxylic acids (see Whyte; U.S. Pat. No. 3,579,548; issued May 18, 1971); liquid ethers and ether esters containing the neopentyl moiety (see Minich; U.S. Pat. No. 2,962,419; issued Nov. 29, 1960); liquid fatty polyethers of polyglycerol (See Hunter et al; U.S. Pat. No. 3,932,532; issued Jan. 13, 1976); liquid alkyl glycoside fatty acid polyesters (see Meyer et al; U.S. Pat. No. 4,840,815; issued Jun. 20, 1989); liquid polyesters of two ether linked hydroxypolycarboxylic acids (e.g., citric or isocitric acid) (see Huhn et al; U.S. Pat. No. 4,888,195; issued Dec. 19, 1988); various liquid esterfied alkoxylated polyols including liquid esters of epoxide-extended polyols such as liquid esterified propoxylated glycerins (see White et al; U.S. Pat. No. 4,861,613; issued Aug. 29, 1989; Cooper et al; U.S. Pat. No. 5,399,729; issued Mar. 21, 1995; Mazurek; U.S. Pat. No. 5,589,217; issued Dec. 31, 1996; and Mazurek; U.S. Pat. No. 5,597,605; issued Jan. 28, 1997); liquid esterified ethoxylated sugar and sugar alcohol esters (see Ennis et al; U.S. Pat. No. 5,077,073); liquid esterified ethoxylated alkyl glycosides (see Ennis et al; U.S. Pat. No. 5,059,443, issued Oct. 22, 1991); liquid esterified alkoxylated polysaccharides (see Cooper; U.S. Pat. No. 5,273,772; issued Dec. 28, 1993); liquid linked esterified alkoxylated polyols (see Ferenz; U.S. Pat. No. 5,427,815; issued Jun. 27, 1995 and Ferenz et al; U.S. Pat. No. 5,374,446; issued Dec. 20, 1994); liquid esterfied polyoxyalkylene block copolymers (see Cooper; U.S. Pat. No. 5,308,634; issued May 3, 1994); liquid esterified polyethers containing ring-opened oxolane units (see Cooper; U.S. Pat. No. 5,389,392; issued Feb. 14, 1995); liquid alkoxylated polyglycerol polyesters (see Harris; U.S. Pat. No. 5,399,371; issued Mar. 21, 1995); liquid partially esterified polysaccharides (see White; U.S. Pat. No. 4,959,466; issued Sep. 25, 1990); as well as liquid polydimethyl siloxanes (e.g., Fluid Silicones available from Dow Corning). All of the foregoing patents relating to the liquid nondigestible oil component are incorporated herein by reference. Solid non-digestible fats or other solid materials can be added to the liquid non-digestible oils to prevent passive oil loss. Particularly preferred non-digestible fat compositions include those described in U.S. Pat. No. 5,490,995 issued to Corrigan, 1996, U.S. Pat. No. 5,480,667 issued to Corrigan et al, 1996, U.S. Pat. No. 5,451,416 issued to Johnston et al, 1995 and U.S. Pat. No. 5,422,131 issued to Elsen et al, 1995. U.S. Pat. No. 5,419,925 issued to Seiden et al, 1995 describes mixtures of reduced calorie triglycerides and polyol polyesters that can be used herein but provides more digestible fat than is typically preferred.

The preferred non-digestible fats are fatty materials having properties similar to triglycerides such as sucrose polyesters. OLEAN®, a preferred non-digestible fat, is made by The Procter and Gamble Company. These preferred non-digestible fats are described in Young et al., U.S. Pat. No. 5,085,884, issued Feb. 4, 1992, and U.S. Pat. No. 5,422,131, issued Jun. 6, 1995 to Elsen et al.

It is preferred to fry the snack pieces in a fat composition comprising a non-digestible fat at temperatures of from about 275° F. (135° C.) to about 400° F. (204° C.), preferably from about 300° F. (148° C.) to about 375° F. (191° C.), and more preferably from about 315° F. (157° C.) to about 350° F. (177° C.) for a time sufficient to form a product having from about 0.5% to about 6.0%, preferably from about 1.0% to about 5.0%, and more preferably from about 2.0% to about 4.0%, moisture. The exact frying time is controlled by the temperature of the frying fat and the starting water content of the dough which can be easily determined by one skilled in the art.

Preferably, the snack pieces are fried in oil using a continuous frying method and are constrained during frying. This constrained frying method and apparatus is described in U.S. Pat. No. 3,626,466 (Liepa, 1971). The shaped, constrained pieces are passed through the frying medium until they are fried to a crisp state with a final moisture content of from about 0.5% to about 4.0% water, preferably 1.0% to 2.0%.

Continuous frying or batch frying of the snack pieces in a non-constrained mode is also acceptable. In this method the pieces are immersed in the frying fat on a moving belt or basket.

ANALYTICAL METHODS

Oscillatory Test Method

Rheological Properties (G' & G")

Oscillatory testing involves applying a small, non-destructive sinudoidal stress on the sample and measuring the strain output. The elastic modulus is a measurement of how elasticity or fluidity of the dough is derived from the dough's response to the applied stress. G' was examined because the dough visco-elastic properties change with work input and emulsifier level in the dough. G' measures the ability to store energy in the dough. The viscous modulus G" applies to fluidity. G" is defined as the viscous modulus (or loss modulus) of viscoelastic materials. G' and G" are used as a measurement of dough's response to work input during processing. A high G' number indicates a more rigid, solid-like material. A lower G' means the material flows more readily and may be easily deformed.

The rheological properties of the dough are measured by preparing a dough comprising:
 a) 200 g starch-based material;
 b) 90 g of water; and
 c) 0.5 of emulsifier.

The dough is made in a small Cuisinart® mixer at low speed for 10–20 seconds. After mixing the dough is sheeted using a conventional milling machine to a thickness of from about 0.021 to about 0.025 inches. The mill rolls are about 1.2 meters in length×0.75 meter in diameter.

A Control Stress Rheomether (CSL2 100) (TA Instruments Inc., New Castle Del.) is used to measure G' and G".

The dynamic testing was done with a 4 cm cross-hatch parallel plate at 32.2 deg. C. This is an average temperature at which the dough is sheeted out between the rollers.

1) A sample is placed on the bottom plate, and zeroed the gap by lowering the top plate to 80% compression of the original thickness of the dough piece (~0.1 mm). The sample is trimmed to the same size as the upper plate. The exposed edge of the sample is coated with a thin layer of mineral oil to minimize moisture loss during the test.

2) All samples are rested or allowed to equilibrate for 2 min. before the measurement to relax any stresses introduced during the sample mounting.

3) Stress sweep was performed at low and high frequencies in order to find the linear viscoelastic region for the dough, where the sample structure is undisturbed.

4) A frequency sweep is performed at one stress in the linear viscoelastic region to determine the sample's structure changes with increasing frequency of oscillation. This gives a representative view of how the elastic and viscous components behave in the sample.

5) The elastic modulus (G'), and loss modulus (G") are recorded at both 1 and 100 rad/sec. In general, the data recorded at 1 rad/sec is used to compare different compositions and process conditions.

Sheet Strength Test

The sheet strength is determined as follows: Sheet strength is the measurement of the force needed to break a dough sheet of 0.635 mm. The sheet strength is read as the maximum peak force (gf) of a graph obtained from force against distance. The test is designed to measure potato dough sheet strength. All products are tested at room temperature. Sheet strength is an average of ten repetitions of each test. The sheet strength is measured by preparing a dough comprising:
 a) 200 g of solids;
 b) 90 g of water; and
 c) 0.5 g of emulsifier.

The dough is made in a small Cuisinart® mixer at low speed for 10–20 seconds. After mixing, the dough is sheeted using a conventional milling machine to a thickness of 0.635 mm (22 mils). The mill rolls are usually 1.2 meter length× 0.75 diameter meter.

This test is conducted using a Texture Analyzer (TA-XT2) from Texture Technologies Corp. This equipment uses a software called XTRAD. This test utilizes a 7/16" diameter acrylic cylinder probe (TA-108), which has a smooth edge to minimize any cutting of the dough sheet. The dough sheet is held between two aluminum plates (10×10 cm). The aluminum plates have a 7 cm diameter opening in the center. Through this opening the probe makes contact with the sheet and pushes it downwards until it breaks. These plates have an opening in each corner to hold the sheet dough in place. Each dough sheet is pre-punched with holes to fit over the alignment pins at the corners of the plate and cut to the size (10×10 cm) of the plate. This provides uniform tension as the probe moves down and through the sheet. The probe travels at 2.0 mm/second until the dough sheet surface is detected at 20 grams of force. The probe then travels at 1.0 mm/second for up to 50 mm, a distance chosen to stretch the dough sheet until it thoroughly ruptures. The probe withdraws at 10.0 mm/second. The probe is run in a "Force vs Compression" mode, which means the probe will move downward measuring the force.

Extensibility Method

The extensibility of the sheet strip is measured using an Instron Universal Testing Machine Model 1123 set with a crosshead speed of 5 inches/minute, a full scale load of 10%, and a chart recorder speed of 10 inches/minute.

1) A dough formulation is milled using a conventional milling machine to form a sheet with a thickness of 0.0020–0.0022 inches.
2) The sheet is cut into a rectangular strip 1" in width by 6' in length.
3) The top of the sheet strip (about ¼ inch) is placed within a spring clamp that is attached to the movable crosshead of the Instron. The clamp is slightly wider than the strip and the pressure is high enough to hold the strip, but low enough so as not to make an indelible mark in the strip that would result in a fracture point or tear in the strip. The top clamp is attached to the crosshead via a swivel connector to allow flexible movement of the strip prior to load application.
4) The bottom part of the sheet strip (about ¼') is attached to a similar clamp that is attached to the Instron load cell.
5) The linear distance between the lowest part of the crosshead clamp and the uppermost part of the load cell lower clamp is initially less than 4 inches to allow loading of the dough in the clamps. Prior to the start of the measurement, the crosshead is moved upward to make the dough slightly taught between the clamps, about 5.5 inches of distance between the upper and lower clamp.
6) The dough is loaded within the clamps within 1 minute of sheeting or it is discarded.
7) Once the dough is taught between the clamps, the measurement is begun by moving the crosshead upward at a preset fixed rate (5 inches/minute). A strip chart records the force measured by the load cell during the normal upward strain placed on the dough.
8) Once the dough strip breaks as indicated visually and by an absence of force recorded by the load cell, the measurement is stopped. The extensibility is measured as the distance measured on the strip chart recorder paper between the start of strain to the absence of strain provided by the load cell.

Internal Fat Distribution

This procedure shows the fat within cross sections of chips.

Snack products are freeze sectioned (~16–18 m thick) placed on pre-cleaned slides. Sections are separately stained in Osmium Tetroxide vapors. The sections are imaged using a black and white (B/W) Dage video camera. The Osmium Tetroxide section shows the fat location in the chip structures.

Equipment

| | |
|---|---|
| Minotome, Microtome Cryostat | Model 3398, Damon/EC Division |
| Specimen Holder Plate and disc | Damon/IEC Division |
| Microscope | Universal, Zeiss, capable of magnifications up to 800X; 5X eyepiece. |
| Video camera | Dage Vidicon, B/W |
| Glass Slides & covers | Standard microscopic variety |
| Desiccators | Solid cover, Pyrex, large I. D 250 mm; small I. D |
| Masking tape | 2" width |

Reagents

| | |
|---|---|
| Mounting Medium | Tissue Tek |
| Osmic Acid | ½ gram ampoule |
| Methanol (Anhydrous) | |
| Permount (medium used to reduce fading for Iodine vapors stained sections) | |
| Water | De-ionized distilled |
| Mineral Oil | Food Grade |

Sample Preparation

1) Samples were broken into pieces ~½" by ¼"
2) Samples were then place in Tissue Tek medium inside the Minotome Cryostat and quickly frozen for five minutes; after five minutes the samples were mounted on specimen holder disc and allowed to set for ~20–30 minutes before sectioning. Note: Minotome Cryrostat should be set for −24° C.±3° C. and the knife blade should be placed in the Minotome at least 2 hours before sectioning samples.
3) The frozen samples were sectioned ~16–18 m thick and placed on pre-cleaned slides.
4) Slides were then stained in desiccators inside of fume hoods using the above specific stains.

Staining

Osmium Tetroxide the ½ gram ampoule is mixed with a solution of methanol/water (24 mil methanol /1 mil water) and the sections are exposed to the osmium vapors overnight (16 hours). After the sections are removed from the desiccator, the slides are allowed to set in the hood for 1 hr. prior to added mineral oil and cover slip. The samples are then imaged using a 6.3× objective, 1.25 optivar (specific to Zeiss microscope) and a 5× eyepiece.

Sample Imaging

The Dage Vidicon camera is attached to Zeiss Microscope for image capture. The images are captured and the data is processed using Optimas 4.02 software. The measurement utility used is Percent Area. This utility allows you to calculate the percentage of area in an image based on different threshold ranges. The Percent Area is used to compare the areas with fat staining vs. total area. The Percent Area measurements for the fat stained images are obtained using the following thresholds:

| Threshold Name | Thresholds | |
|---|---|---|
| Total area | 5 | 255 |
| Void 3 | 220 | 255 |
| Chip Structure | 70 | 220 |
| Fat | 0 | 70 |

Void Size Measurement & Structure Characterization

Fabricated snacks are extracted and cut or broken to expose a cross section view to observe the void structures present in samples. The samples are rinsed with solvent to remove fat. The samples are dried under nitrogen and placed in a desiccator. Samples are then coated with gold palladium and mounted to view the cross section in the Scanning Electron Microscope (SEM). The SEM shows a three dimensional view of the structure.

| Equipment | |
| --- | --- |
| Scanning Electron Microscope | JEOL, JSM T-300 |
| Beakers | Pyrex, 100 ml |
| Sputter Coater | Edwards 150A |
| Video Camera | Dage Vidicon B/W |
| Imaging Capability | Computer equipped with BioScan Optimas 4.62 Software |
| Coping Saw | |
| Saddle Mold | |
| Sonicator | |
| Reagents | |
| Hexane | Distilled in Glass, UV grade |

Sample Preparation

1) Samples of Pringles potato crisps were cut into pieces approximately ½" by ¼" with a coping saw over the Pringles saddle mold. This was done to give an even surface for SEM observation of the void structure. Crisps which are not in a molded form were broken into pieces approximately ½" by ¼".
2) These cut or broken samples were placed in 100 ml beakers and covered with hexane.
3) The beakers were then place in a Sonicator for 5 min. and the solvent was decanted and replaced. The solvent replacement and sonication was done 4 times.
4) Hexane was again added and the samples were placed on the steam bath and heated until solvent began to boil. The remaining solvent was decanted, replaced with fresh solvent and heated again. The remaining solvent was decanted and samples were placed under nitrogen to remove any remaining solvent.
5) After solvent removal the samples were placed in a desiccator overnight to dry.
6) Samples were sputter coated with gold palladium and placed in a sample holder which exposes the cut or broken edge.
7) Samples were placed in the SEM and cross section images were captured.

| SEM Conditions |
| --- |
| 10kV |
| 10° stage tilt |
| 150X - magnification |

Sample Imaging

The Dage Vidicon camera was attached to the video out connector on the JSM T-300 SEM.

Structural features of the image (voids, nodules, chip mass) were manually identified and marked then measured for relative areas vs. the total image area. A grid was overlaid on the photograph of the entire cross sectional area of the product where the grid was composed of individual square cellunits of 0.2 cm length by 0.2 cm width with an 0.04 cm2 cross sectional area per cell unit. The total photographic size including the product cross section and images of the mounting background was about 7.5 cm in length by 7.5 cm in width. The scaling ration between the total photograph area to individual grid cell unit area was about 1406:1 and this ratio should be maintained for any enlargements or reductions to provide consistent imaging analysis.

The first step of the imaging analysis was to count the total number of grid unit cells occupied by the product cross sectional area to derive a total product area. Total void area was determined by counting the number of grid cell units displaying a darker or essentially darker gray to black contrast since these represent areas of depth with increased light absorption. Individual void size areas were determined by outlining the void areas, overlaying the grid on the areas, and counting the number of individual grid cells occupied.

Nodules were characterized by circular, semi-circular or elliptical areas of solid structure surrounded by a cell wall extending up into the three dimensional plane providing a bubble like appearance. The nodule structures were outlined, the grid was overlaid, and the number of individual grid unit cells occupied was counted.

Volume Hydration Ratio Rest

1) A whole chip is weighed on a balance to +0.01 g.
2) The chip is then submersed in a beaker of water at ambient temperature (70–80° F.) for 10 seconds and removed.
3) The chip is allowed to drain over the beaker for 5 seconds with the excess surface water shaken off.
4) The chip is blotted with a clean, dry absorbent paper tissue (e.g. Kimwipes®) to again remove any apparent surface water.
5) The hydrated chip is re-weighed to +0.01 g.
6) The difference between the hydrated and original chip weights is divided by the original chip weight and hydration time to calculate the hydration rate.
7) The above procedure is repeated for twenty chips and an average hydration rate is calculated.

The following examples illustrate the invention in more detail but are not meant to be limiting thereof.

EXAMPLE 1

The following ingredients are combined in the manner described below to form a low-fat snack of the present invention.

| Ingredient | Wt. % |
| --- | --- |
| STARCH BASED PRE-BLEND | |
| Potato flakes (8.5) | 83.5 |
| Potato granules (4.7) | 8.4 |
| Rice flour | 6.5 |
| N-Lite LP ™ (modified starch) | 1.6 |
| Total | 100.0 |
| WATER BASED PRE-BLEND | |
| Maltodextrin DE 18 | 8 |
| Water | 91.2 |
| Salt | 0.4 |
| Sugar | 0.4 |

| -continued | |
|---|---|
| Ingredient | Wt. % |
| Total | 100.0 |
| EMULSIFIER-LIPID BLEND | |
| Mono-diglyceride | 12.75% |
| Polyglycerolester | 2.25 |
| Non-digestible fat | 85% |

A mix containing 64.3% of a starch based flour pre-blend, 32.7% of a water pre-blend, and 3.0% of the emulsifier-lipid composition are blended in a Turbolizer® to form a loose, dry dough (~15–60 seconds). The dough is sheeted by continuously feeding it through a pair of sheeting rolls forming an elastic continuous sheet without pin holes. Sheet thickness is controlled to 0.02 inches (0.05 cm). The front roll is heated to about 90° F. (32° C.) and the back roll is heated to about 135° F. (57° C.). The dough sheet is then cut into oval shaped pieces and fried in a constrained frying mold at 385° F. (196° C.) in OLEAN® (made by The Procter and Gamble Company) for about 12 seconds. The product is held in the molds for about 20 seconds to allow the OLEAN® to drain. The resulting product has a crisp texture. The non-digestible fat level is about 30%. The digestible fat level from the emulsifier is less than 0.3 grams/30 gram serving.

The rheological properties of the dough are:

| Property | Value |
|---|---|
| Sheet Strength | 197 gm-force |
| Extensibility | 11 cm |
| G' kPa | 40 |
| G" kPa | 12 |

The physical properties of the final chip product are:

| Property | Value |
|---|---|
| % Internal Fat Distribution | 41 |
| % Total Void Area | 31 |
| % Nodular Void Area | 15–20 |
| Volume Hydration Ratio gm water/gm chip | 0.198 |
| % Surface Fat | 5.5 |

EXAMPLE 2

A mix containing 62.1% of a starch-based flour pre-blend, 34.8% of a water pre-blend, and 3.95% of the emulsifier/lipid composition are combined in the manner described in Example 1 to form a low-fat snack of the present invention.

| Ingredient | Wt. % |
|---|---|
| STARCH BASED PRE-BLEND | |
| Potato flakes (8.5) | 85.6 |
| Potato granules (4.0) | 9.4 |

| -continued | |
|---|---|
| Ingredient | Wt. % |
| *N-Creamer (pregelatinized, waxy corn) | 1.0 |
| *Ultrasperse-A ™ (modified starch) | 4.0 |
| Total | 100.0 |
| *Available from National Starch Co. | |
| WATER BASED PRE-BLEND | |
| Maltodextrin DE 18 | 8 |
| Water | 91.2 |
| Salt | 0.4 |
| Sugar | 0.4 |
| Total | 100.0 |
| EMULSIFIER-LIPID BLEND | |
| Mono-diglyceride | 12.75% |
| Polyglycerolester | 2.25 |
| Non-digestible fat | 85% |

What is claimed is:

1. A fabricated snack made from a dough composition comprising:
    a) from about 50% to about 70% starch-based material;
    b) from about 20% to about 50% added water; and
    c) from about 0.5% to about 8.0% of an emulsifier-lipid component comprising;
        (i) from about 2.0% to about 40% of a mono-diglyceride component comprising from about 30% to about 98% monoglyceride and less than 50% free glycerine;
        (ii) from about 0.5% to about 40% of a polyglycerol ester component comprising less than 50% free glycerine and having from about 2 to about 10 glycerol units per polyglycerol moiety and from about 5% to about 60% monoester; and
        (iii) from about 60.0% to about 97.5% fat, wherein the snack comprises less than 9% surface fat having a viscosity of greater than 103 cp.

2. The fabricated snack of claim 1, comprising from about 0.5% to about 6% moisture and from about 20% to about 38% fat.

3. The fabricated snack of claim 1 wherein the dough composition has a G' from about 5.0 kPa to about 3.0 kPa.

4. The fabricated snack of claim 2 wherein the snack has an internal structure comprising a multiplicity of internal voids and a total internal void area of at least 21%.

5. The fabricated snack of claim 4 wherein the internal voids have a void size from about 0.1 to about 1.5.

6. The fabricated snack of claim 4 wherein at least 25% of the fat is distributed across the internal void area.

7. The fabricated snack of claim 4 wherein the fabricated snack is a chip.

8. The fabricated snack of claim 7, wherein the fat is a non-digestible fat or tri-glyceride.

9. A dough composition comprising:
    a) from about 50% to about 70% starch-based material;
    b) from about 20% to about 50% added water; and
    c) from about 0.5% to about 8.0% of an emulsifier-lipid component comprising;
        (i) from about 2.0% to about 40% of a mono-glyceride component comprising from about 30% to about 98% monoglyceride and less than 2.0% free glycerine;
        (ii) from about 0.5% to about 40% of a polyglycerol ester component comprising less than 50% free glycerine and having from about 2 to about 10 glycerol units per polyglycerol moiety and from about 5% to about 60% monoester; and (iii) from about 60.0% to about 97.5% fat.

10. The dough composition of claim 9 wherein the fat is a non-digestible fat.

11. The dough composition of claim 9 wherein the monoglyceride is a distilled monoglyceride.

12. The dough composition of claim 9 wherein the monoglyceride component is a mono-diglyceride.

13. The dough composition of claim 11, wherein the distilled monoglyceride comprises from about 80% to about 95% monoglyceride and wherein the polyglycerol ester comprises less than 25% free glycerine.

14. The dough composition of claim 13 wherein the starch-based materials are selected from the group consisting of potato flakes, potato granules, rice flour, potato flour, modified starch, pregelatinized starch, wheat starch, waxy corn starch, waxy rice starch and mixtures thereof.

15. The dough composition of claim 14, comprising at least about 3% hydrolyzed starch having a DE of from about 5.0 to about 30.

16. The dough composition of claim 15 wherein the potato flakes comprise from about 16% to about 27% amylose and have a water absorption index of from about 6.7 to about 9.5 grams of water per gram of flake and wherein the potato granules comprise from about 9% to about 13% amylose and have a water absorption index of from about 4.0 to about 7 grams of water per gram of granule.

17. The dough composition of claim 11 wherein the dough composition is sheetable and wherein the dough has a sheet strength of from about 140 gf to about 250 gf.

18. The dough composition of claim 12 wherein the dough composition is sheetable and wherein the dough has a sheet strength of from about 140 gf to about 250 gf.

19. The dough composition of claim 15 wherein the dough composition is sheetable and wherein the dough has a sheet strength of from about 140 gf to about 250 gf.

* * * * *